US010891921B2

(12) United States Patent
Mittal et al.

(10) Patent No.: US 10,891,921 B2
(45) Date of Patent: Jan. 12, 2021

(54) SEPARATE OPERATING SYSTEMS FOR DASHBOARD DISPLAY

(71) Applicant: Byton Limited, Hong Kong (HK)

(72) Inventors: Himanshu Mittal, Santa Clara, CA (US); Wilson Li, Santa Clara, CA (US); Ganesh Raman, Santa Clara, CA (US); Kun Ma, Santa Clara, CA (US); Shyam Narayan, Dublin, CA (US); Sanjay Madhavarao, Santa Clara, CA (US); Peter Mortensen, Santa Clara, CA (US); Balram Panwar, Santa Clara, CA (US)

(73) Assignee: Byton Limited, Santa Clara, CA (US)

( * ) Notice: Subject to any disclaimer, the term of this patent is extended or adjusted under 35 U.S.C. 154(b) by 0 days.

(21) Appl. No.: 16/240,701

(22) Filed: Jan. 4, 2019

(65) Prior Publication Data
US 2020/0219469 A1 Jul. 9, 2020

(51) Int. Cl.
| | |
|---|---|
| *G06F 9/4401* | (2018.01) |
| *G09G 5/00* | (2006.01) |
| *G09G 5/377* | (2006.01) |
| *B60K 37/02* | (2006.01) |
| *B60K 35/00* | (2006.01) |

(52) U.S. Cl.
CPC .......... *G09G 5/377* (2013.01); *G06F 9/4406* (2013.01); *G09G 5/006* (2013.01); *B60K 35/00* (2013.01); *B60K 37/02* (2013.01); *B60K 2370/52* (2019.05); *G09G 2370/20* (2013.01); *G09G 2380/10* (2013.01)

(58) Field of Classification Search
CPC .... G09G 5/377; G09G 5/006; G09G 2370/20; G09G 2380/10; G06F 9/4406; B60K 2370/52; B60K 35/00; B60K 37/02
See application file for complete search history.

(56) References Cited

U.S. PATENT DOCUMENTS

| | | | |
|---|---|---|---|
| 5,651,107 A  * | 7/1997 | Frank ................... | G06F 3/0481 345/589 |
| 2016/0328254 A1* | 11/2016 | Ahmed ............... | G06F 9/45558 |
| 2017/0039084 A1* | 2/2017 | Atsmon .............. | G06F 9/45558 |
| 2018/0208060 A1* | 7/2018 | Kim ...................... | B60W 50/14 |

* cited by examiner

*Primary Examiner* — Sing-Wai Wu
(74) *Attorney, Agent, or Firm* — Womble Bond Dickinson (US) LLP

(57) ABSTRACT

Systems and methods for outputting to a vehicle dashboard screen from multiple operating systems are described in this disclosure. The systems and methods use a computing device to host different types of applications in the operating systems. A first of the operating systems runs driving-critical applications, and a second of the operating systems can run non-driving-critical applications. The first operating system has direct access to display hardware on the computing device, and can include security features to prevent it from being compromised. Outputs generated by the non-driving-critical applications in the second operating system are sent to the first operating system, where the outputs are combined with outputs from the driving-critical applications, to create a series of composite images for display on the dashboard screen. Either the first operating system or the second operating system can control the whole dashboard screen based on predetermined configurations.

27 Claims, 16 Drawing Sheets

SEPARATE OPERATING SYSTEMS FOR DASHBOARD DISPLAY

FIELD OF INVENTION

Embodiments of the present disclosure are generally related to vehicle systems, and are particularly related to using separate operating systems for a single dashboard screen in a vehicle.

BACKGROUND

Present vehicles are increasingly computerized, and loaded with software applications. These software applications can include applications that are critical to the driving or piloting of the vehicle, and those that are not. The driving-critical applications can include an instrument cluster application, and the non-driving-critical applications can include one or more infotainment applications.

Some vehicles are designed with a single dashboard screen to be shared by a driver or pilot with passengers, so that both types of applications can be displayed on the same screen. For such vehicles, running both types of applications in one operating system would facilitate information display on the screen, but could present challenges for the safe operation of the vehicle.

For example, if the operating system crashes, all applications in the operating system, including the driving-critical applications, would be taken down. Running the two types of applications in separate computing systems, on the other hand, would require additional hardware, which is not only costly, but also increases design complexity of a vehicle.

SUMMARY

Systems and methods for outputting to a vehicle dashboard screen from multiple operating systems are described in this disclosure. The systems and methods use a computing device to host different types of applications in the operating systems. A first of the operating systems runs driving-critical applications, and a second of the operating systems can run non-driving-critical applications. The first operating system has direct access to display hardware on the computing device, and can include security features to prevent it from being compromised. Outputs generated by the non-driving-critical applications in the second operating system are sent to the first operating system, where the outputs are combined with outputs from the driving-critical applications, to create a series of composite images for display on the dashboard screen. Either the first operating system or the second operating system can control the whole dashboard screen based on predetermined configurations.

BRIEF DESCRIPTION OF THE DRAWINGS

The figures of the accompanying drawings provide examples of embodiments. Like references indicate similar elements.

DETAILED DESCRIPTION

Figure 1:
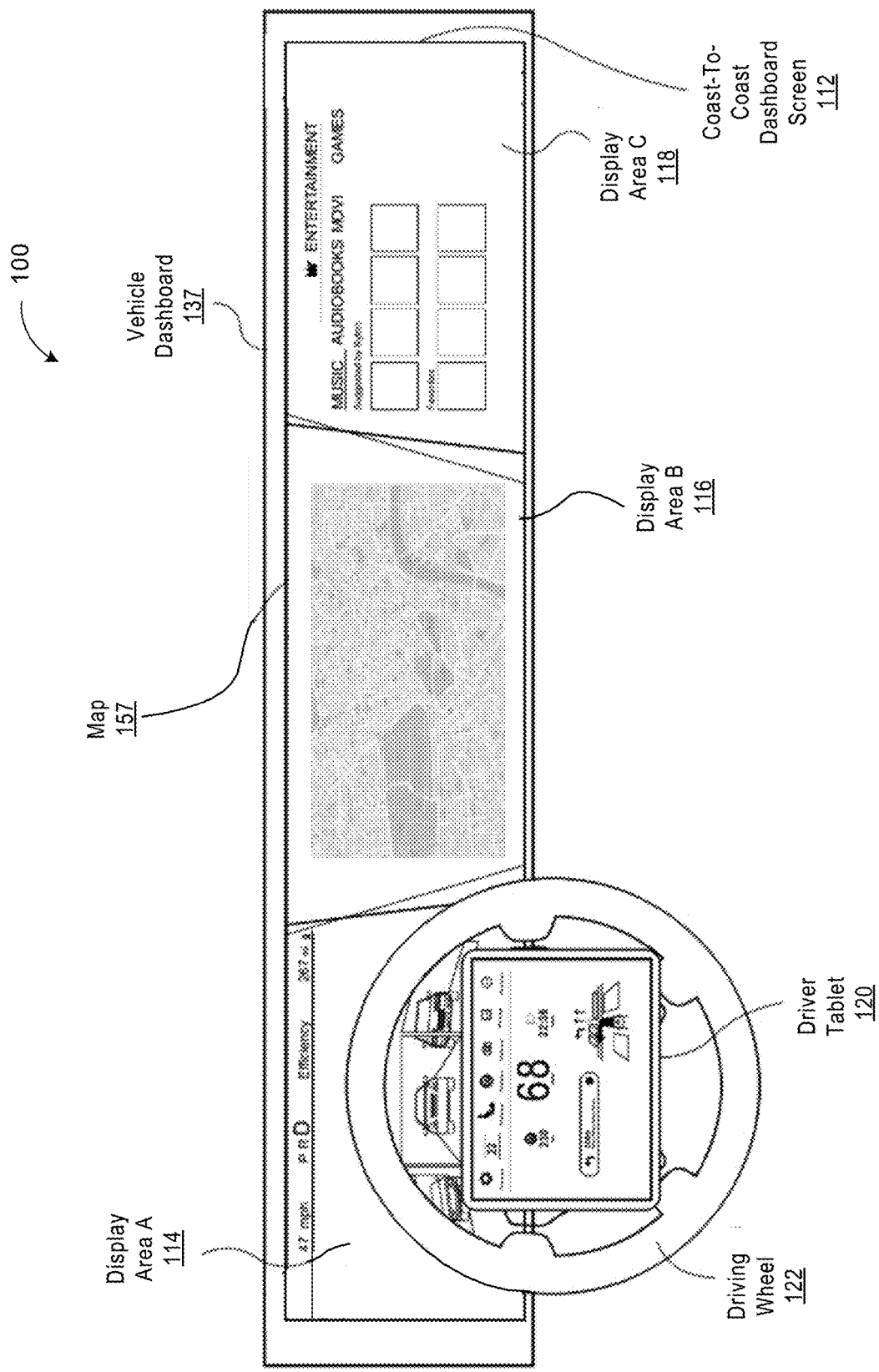
FIG. 1 illustrates one example of an inside view of a control environment 100 of a vehicle, in accordance with an embodiment.

The systems and methods for using multiple control displays to control displaying applications on a dashboard screen in a vehicle are described below. As used herein, a vehicle can be a road vehicle, such as an automobile, a van, a truck, and a bus; a train; an aircraft, such as an airplane; a spacecraft; or any machinery that transports people or things.

In the specification, reference to "one embodiment" or "an embodiment" means that a particular feature, structure, or characteristic described in conjunction with the embodiment can be included in at least one embodiment. The appearances of the phrase "for one embodiment" or "for an embodiment" in various places in the specification do not necessarily all refer to the same embodiment.

For one embodiment, a system for outputting to a dashboard screen for a vehicle from a plurality of operating systems includes a computing device which includes display hardware, the computing device embedded in the vehicle; and a first operating system and a second operating system installed on the computing device. The first operating system has direct access to the display hardware, and is to generate a first image, receive a second image from the second operating system, create a composite image by combining the first image and the second image, and transmit the composite image to the display hardware for display on the dashboard screen.

For one embodiment, a method for outputting to a dashboard screen for a vehicle from a plurality of operating systems includes generating a first image by a first operating system; receiving, at the first operating system, a second image from a second operating system, wherein the first operating system and the second operating system are both installed on a computing device embedded in a vehicle, the computing device including display hardware, wherein the first operating system has direct access to the display hardware; creating, by the first operating system, a composite image by combining the first image and the second image; and sending, by the first operating system, the composite image to the display hardware for display on the dashboard screen.

For one embodiment, the computing device can be a single integrated circuit, a device including a plurality of chips integrated onto a motherboard, or a device including a plurality of integrated circuits. For another embodiment, the computing device can be part of a chipset, which includes a plurality of integrated circuits, wherein each of the plurality of integrated circuits in the chipset runs a same software stack.

For one embodiment, the first operating system can be a Unix-like real-time operating system, for example, the QNX® operating system (from Blackberry Limited of Waterloo, Canada), and the second operating system can be Linux-like operating system, such as Android (from Google of Mountain View, Calif.). The first operating system can run driving-critical applications, for example, instrument cluster applications, advanced driver-assistance systems (ADAS), and exterior view camera, radar, or other sensor-based applications. The second operating system can run non-driving critical applications, for example, a media player and a video conferencing application. The computing device can be connected to the dashboard screen using a physical cable, such as a HDMI or DVI cable, or using a wireless (e.g., WiFi or Bluetooth) connection.

For one embodiment, each operating system can run in a virtual machine installed on a computing device, and managed by a hypervisor. The hypervisor can include the first operating system. Alternatively, the first operating system can operate as a hypervisor, or provide a runtime environment for the hypervisor. The hypervisor can be installed directly onto the integrated circuit without another operating system underlying the hypervisor; and therefore can have direct access to hardware devices, so that the first operating system can control physical display-related functions of the computing device.

For one embodiment, other virtualization models can be used to implement the features described in the disclosure. For example, both the first operating system and the second operating system run on a third operating system that provides virtualization services, such as I/O device support and memory management, where both the first operating system and the second operating system can be managed a hypervisor running on the third operating system.

For one embodiment, the first operating system can be automatically booted when the hypervisor is launched, and after a configurable period of time, the second operating system can boot and run on top of the first operating system. The first operating system can include a number of high-performance features (e.g., microkernel architecture) and enhanced kernel-level security features (e.g., policy-based access control) to boost performance of the operating system and to prevent the operating system from being hacked or infected with viruses or malware. These features enable the hypervisor to safely separate and isolate the second operating system so that the infotainment applications can safely re-start without affecting the instrument cluster.

For one embodiment, when the first operating system boots, it can send a background image or a composite image of the background image and an image from a driving-critical application to a video card on the computing device. The video card can display the background image or the composite image on the dashboard screen at a predetermined frame rate. After the second operating system boots, it can create a transparent composite image from the non-driving-critical applications using a display application programming interface (API) as part of a display framework in the second operating system, and send the transparent composite image to the first operating system, where it is further combined with the composite image previously created, to formulate an overall composite image. The overall composite image, when being displayed on the dashboard screen, can show the seamless merging of the transparent image with the background image. The second operating system can also include a display API to create a transparent component or combine a transparent image with a non-transparent image.

For one embodiment, when a transparent image is combined with a non-transparent image to create a composite image, the composite can show the two images are seamlessly merged into one image, as if the transparent image is part of the non-transparent image, as can be shown below.

For one embodiment, the background image can be determined based on a geographical location of the vehicle. If the vehicle is within a predetermined proximity (e.g., 20 miles) of a city, the background image can be an icon image of the city. If the vehicle is in an urban area without a well-recognized icon, the background image would be a building or another image that is typically associated with an urban area. Similarly, if the vehicle in the countryside, the background image would be a farm or another image that is typically associated with the countryside.

For one embodiment, while the first operating system and the second operating system can share the dashboard screen, either the first operating system or the second operating system can take over the whole dashboard screen without sharing the screen with the other operating system. For example, when a vehicle is parked, only applications from the second operating system can be displayed on the dashboard screen. This feature allows drivers and/or passengers in a vehicle to fully enjoy the infotainment applications while the safety of the vehicle is not a concern. As another example, the whole dashboard screen can be taken over by the first operating system when the vehicle is being parked or backed up, to show a clearer view of what is around or behind the vehicle, so that any blind spot can be eliminated.

For one embodiment, in addition to the kernel-level security features implemented in the first operating system, additional security features can be implemented at the integrated circuit level. For example, prior to booting an application on the integrated circuit, a high assurance boot (HAB) library can be used to verify digital signatures of that application, so that only authenticated software applications can run on the integrated circuit. This feature adds another layer of security to prevent malicious traffic from entering into the first operating system from the second operating system.

For one embodiment, more than one operating system on the integrated circuit can be configured to run the non-driving critical applications. Outputs from the non-driving critical applications can be similarly sent to the first operating system, which can compose outputs from different operating systems into one or more composite images for display on the dashboard screen.

For one embodiment, the dashboard screen is a coast-to-coast dashboard screen, also referred to as a shared-experience display (SED) that is substantially as wide as the width of the vehicle.

The disclosure also includes various embodiments that describe systems and methods for using multiple control displays to control displaying applications on a dashboard screen in a vehicle.

For one embodiment, a system for displaying applications on a dashboard screen in a vehicle includes a computing device embedded in the vehicle, the computing device connected to the dashboard screen, a first control display, and a second control display; an operating system installed on the computing device, the operating system running a controlling application, and one or more non-driving-critical applications. The controlling application is to launch the one or more non-driving-critical applications on the display screen in response to receiving a user selection from at least one of the first control display and the second control display.

For one embodiment, the dashboard screen is split into a plurality of virtual display areas, and wherein each of the first control display and the second control display is to control a separate virtual display area of the plurality of virtual display areas. Each of the first control display and the second control display is a touchscreen display capable of displaying an user-touch selectable application menu for controlling the display on the virtual display areas, the first control display positioned within a driving wheel of the vehicle and the second control display positioned between a first front seat and a second front seat in the vehicle.

For one embodiment, the computing device is a single integrated circuit, a device including a plurality of chips integrated onto a motherboard, or a device including a plurality of integrated circuits. The dashboard screen includes a third virtual display area for displaying driving-critical applications. The first control display includes a function for enabling and disabling a split-screen mode of the dashboard screen, and wherein when the split-screen is disabled, the whole dashboard screen is occupied either by one or more driving-critical applications when the vehicle is in non-autonomous operation or by one or more non-driving critical applications when the vehicle is not in non-autonomous operation. The first control display displays a subset of an application menu that is displayed on the second control display.

For one embodiment, the computing device can include display hardware, the first operating system, and a second operating system. The first operating system has direct access to the display hardware, and is to generate a first image, receive a second image from the second operating system, create a composite image by combining the first image and the second image, and transmit the composite image to the display hardware for display on the dashboard screen.

For one embodiment, the dashboard screen displays a first non-driving-critical application and a second non-driving-critical application in different virtual display areas on the dashboard display if the first non-driving-critical application and the second non-driving application are launched from the first control display and the second control display respectively. The dashboard screen displays the first non-driving-critical application or the second non-driving-critical application in a same virtual display area on the dashboard display if that non-driving-critical application is launched from both the first control display and the second control display, wherein the same virtual display area represents a combined virtual display area of the different virtual display areas that are contiguous.

The embodiments and vehicles described herein can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory.

The above summary does not include an exhaustive list of all embodiments in this disclosure. All systems and methods can be practiced from all suitable combinations of the various aspects and embodiments described in the disclosure.

The following description and drawings are illustrative and are not to be construed as limiting. Numerous specific details are described to provide a thorough understanding of various embodiments. However, in certain instances, well-known or conventional details are not described in order to provide a concise discussion of embodiments.

The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Separate Operating Systems

FIG. 1 illustrates one example of an interior view of a control environment 100 of a vehicle. As shown in FIG. 1, the control environment 100 includes a dashboard screen 112 running substantially from one side to the other side of a vehicle dashboard 137. The coast-to-coast dashboard screen 112 can be a curved display (also referred to as SED 112) that substantially spans the width of the dashboard 137 and that is integrated into the dashboard 137. One or more graphical user interfaces can be provided in a number of display areas such as display areas A 114, display area B 116, and display area C 118.

Such graphical user interfaces can include status menus shown in, e.g., display areas A 114 and display C 118. For one embodiment, display area A 114 can show driving-critical information, such as instrument clusters, and rear view or side view or surround view images of the vehicle from one or more cameras, radars, or other sensors located outside or inside of the vehicle. For one embodiment, display area B 116 and display area C 118 can display non-driving-critical information. For example, display area B 116 can display a map application 157; and display area C 118 can display entertainment settings with preferences for music, audiobooks, movies, and games.

The dashboard 137 can include one more computing devices (not shown) or data processing systems to implement a human user recognition system and to execute the driving-critical and non-driving-critical applications.

For one embodiment, a user capture device can be mounted and located above the dashboard 137 and include a combination of some or all of a camera, radar, microphone/speaker, fingerprint detector, or other sensors for use in capturing information (e.g., facial images, voice data and/or fingerprint data of a driver or passenger). The human user recognition system can compare captured user information with pre-stored user signatures to authenticate a user for access to various electronic or driving controls of the vehicle. The electronic and driving controls of the vehicle can include interior electronic controls such as interfaces on the dashboard screen 112 and a driver tablet 120 mounted on a driving wheel 122. For example, the diver tablet 120 can provide a driver interface for accessing controls including settings and preferences for the vehicle. The coast-to-coast dashboard screen 112 can also display settings and preferences for an identified passenger, for example, personalized user interfaces, personalized seat controls, and personalized driving wheel controls.

Figure 2:
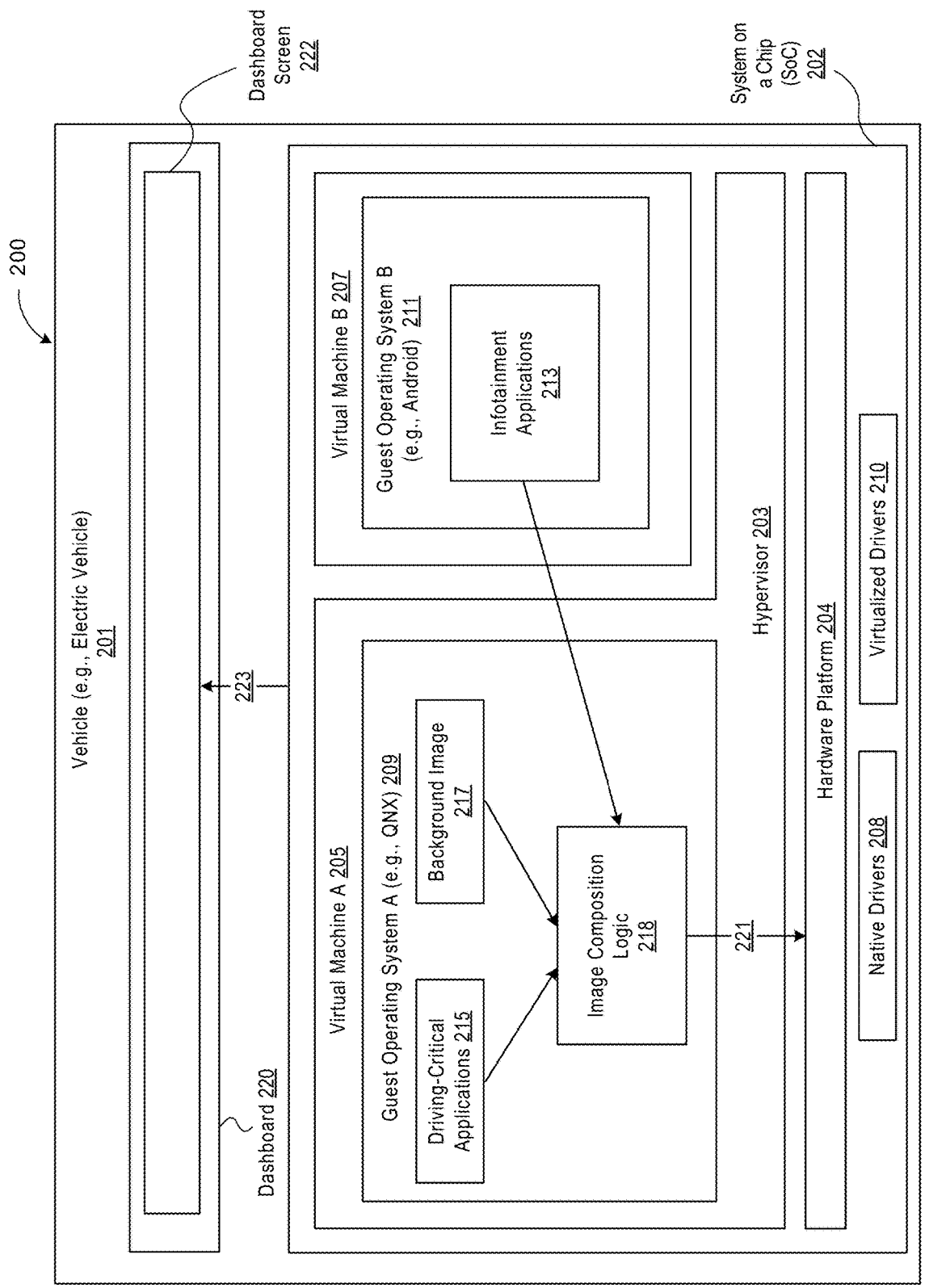
FIG. 2 shows, in block diagram form, an example system 200 for outputting from separate operating systems to a dashboard screen, such as the dashboard screen in FIG. 1, in accordance with an embodiment.

FIG. 2 shows, in block diagram form, an example system 200 for outputting from separate operating systems to a dashboard screen, such as the dashboard screen in FIG. 1. As shown in FIG. 2, a vehicle 201 can include a coast-to-coast dashboard 220 with a dashboard screen 222 mounted thereon, which can receive information for display from a computer device installed in the vehicle. The dashboard screen 222 can be the coast-to-coast screen 122 as described in FIG. 1.

For one embodiment, the computing device represents a system on a chip (SoC) 202, and can be installed under the dashboard 220 or another place within the vehicle. The SoC 202 can be an integrated circuit that incorporates required electronic circuits of numerous computer components onto a single chip, and be connected to the dashboard screen 222 using a physical cable, such as a HDMI or DVI cable, or using a wireless or Bluetooth connection. For one embodiment, the computing device can include multiple chips that are integrated onto a motherboard or into a single package. For one embodiment, the computing device can include multiple SOCs that are integrated into a single device.

The SoC 202 can include a number of virtual machines, for example, virtual machine A 205 and virtual machine B 207. The virtual machines are managed by a hypervisor 203. Each virtual machine can include a guest operating system (OS), for example, guest OS A 209 or guest OS B 211. Guest OS A 209 and guest OS B 211 can be different operating systems in terms of performance, functionality, security, and cost. For example, the guest operating system A 209 can be the QNX® operating system, and the guest operating system 211 can be Android operating system. Guest OS A 209 can run driving-critical applications, for example, instrument cluster applications 11; and guest OS B 211 can run non-driving critical applications, for example, infotainment applications 213.

For one embodiment, the hypervisor 203 can include guest OS A 209 and can be installed directly onto the SoC 202 without another operating system underlying the hypervisor 203. As such, the hypervisor has direct access to hardware platform 204 on the SoC 202 using native drivers 208, so that guest OS A 209 can control physical display functions of the SoC 202. Guest OS A 209 can include a number of high-performance features (e.g., microkernel architecture) and enhanced kernel-level security features (e.g., policy-based access control), to boost performance of the operating system, and to enhance the security of the operating system by preventing the operating system from being hacked, infected with viruses, or otherwise compromised or attacked.

Guest OS A 209 can be automatically booted when the hypervisor 203 is launched, and after a configurable period of time, guest OS B 211 can boot and run on top of guest OS A 209. Guest OS B 211 can access the hardware platform 204 (e.g., GPU) using virtualized drivers 210 to generate one or more frame buffers to hold information for rendering images from guest operating OS B 211. An image composition control logic 218 can be provided in guest OS A 209 to perform a predetermined algorithm for compose composite images from guest OS A 209 and guest OS B 211.

For one embodiment, the image composition logic 218 can be invoked when guest OS A is booted, and can operate to combine a pre-determined background image 217 and an image from driving-critical applications 215 to create a composite image, and send 221 the composite image to the hardware platform 204. The image composition logic 218 can also determine when to display images only from guest OS A 209 (e.g., when a vehicle is backing up), and when to display images only from guest OS B 211 (e.g., when the vehicle is parked). The hardware platform 204 can include a number of display control hardware devices, such as a GPU, a crypto engine, and a video encoder/decoder. The display control hardware devices can use their corresponding drivers 208 to display 223 the composite image to the dashboard screen 222.

For one embodiment, the composite image can be formed into a screen image matching the dashboard screen 222, and stored in a single frame buffer as a large bit map in RAM of a video card on the hardware platform 204. The video card can continually refresh the screen image as updates are received from guest OS A 209.

For one embodiment, after the guest operating system B 211 boots, it can create a transparent composite image from the infotainment applications 213, and send the transparent composite image to the guest operating system A 209, where the image composition logic 218 can combine the composite image with the composite image previously created, to create an overall composite image. The overall composite image, when being displayed on the dashboard screen, can show the seamless merging of the transparent image with the background image.

Figure 3:
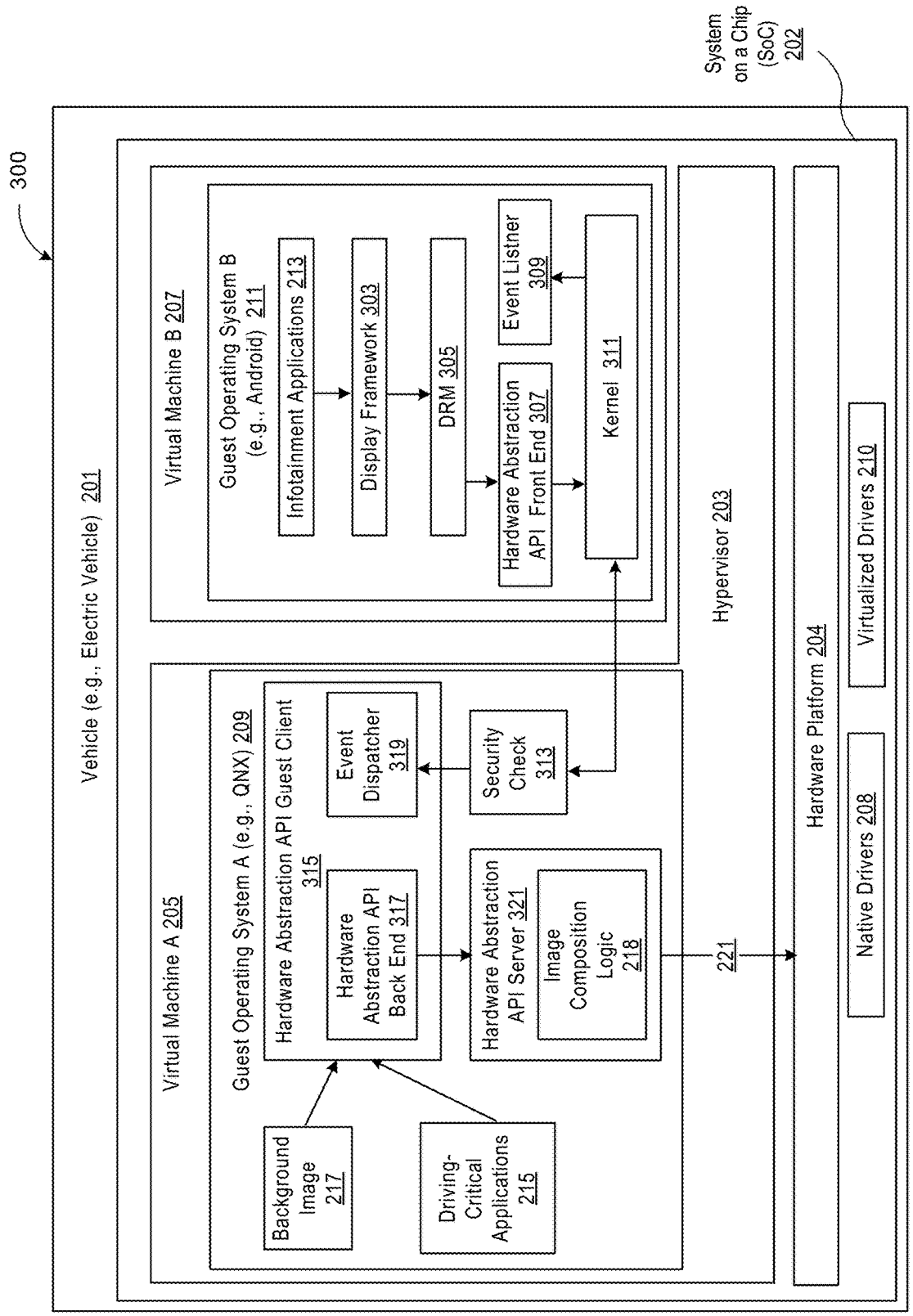
FIG. 3 shows, in block diagram form, an example data flow 300 in the example system described in FIG. 2, in accordance with an embodiment.

FIG. 3 shows, in block diagram form, an example data flow in the example system described in FIG. 2.

For one embodiment, a display framework 303 (e.g., an Android Display Framework) in guest OS B 211 can include a number of APIs and system services, which compose buffers of graphical data from the infotainment applications 213 into a single frame buffer. As used herein, a frame buffer can be a data structure that organizes memory resources needed to render an image.

A direct rendering manager (DRM) subsystem 305 can be called to manage the frame buffer, for example, by configuring display mode setting in a kernel space 311. Display mode settings for one embodiment can include display resolutions and color depth.

As further shown in FIG. 3, a hardware abstraction API guest client 315 can be provided in guest OS A 209 to operate as an interface, through which guest OS A 209 and guest OS B 211 communicate with each other. The interface can be secured by one or more security features 313, including digital signature verification and high assurance boot (HAB), so that only authenticated or trusted applications from guest OS B 211 can use the interface to communicate with guest OS A 209.

For one embodiment, the hardware abstraction API guest client 315 can include a hardware abstraction API backend 317, and an event dispatcher 319. When guest OS A 209 receives a request from a user—for example, a driver or passenger selecting a song to play at a control display—the event dispatcher 319 can launch an event, which can be processed by an event listener 309 registered with the event dispatcher 319. For one embodiment, an event can be any identifiable occurrence representing a message, token, count, pattern, value, or marker that can be recognized within an ongoing stream of monitored inputs. Examples of events that can be launched by the event dispatcher 319 can include a launching of an application from guest OS B 211.

The event listener 309 can subsequently cause the single frame buffer described above to be sent to guest OS A 209 through a hardware abstraction API front end 307, the kernel 311 and the virtualized drivers 210. The hardware abstraction API guest client 315 can also receive requests to display frame buffers representing he background image 217 and one or more driving-critical applications 215. The hardware abstraction API guest client 315, after receiving all the request display requests, can send the requests to a hardware abstraction API server 321. The image composition logic 218 in the hardware abstraction API server 321 can be invoked to composite images for display on the dashboard screen 222.

For one embodiment, the hardware abstraction API front end 307, the hardware abstraction API back end 317, the hardware abstraction API guest client 315, and the hardware abstraction API server 321 together can constitute a low-level hardware abstraction interface for composited windowing systems to utilize composition and display hardware on the SoC 202. In one example, the hardware abstraction interface can be the OpenWF™ API from Open Windowing Foundation™.

Figure 4:
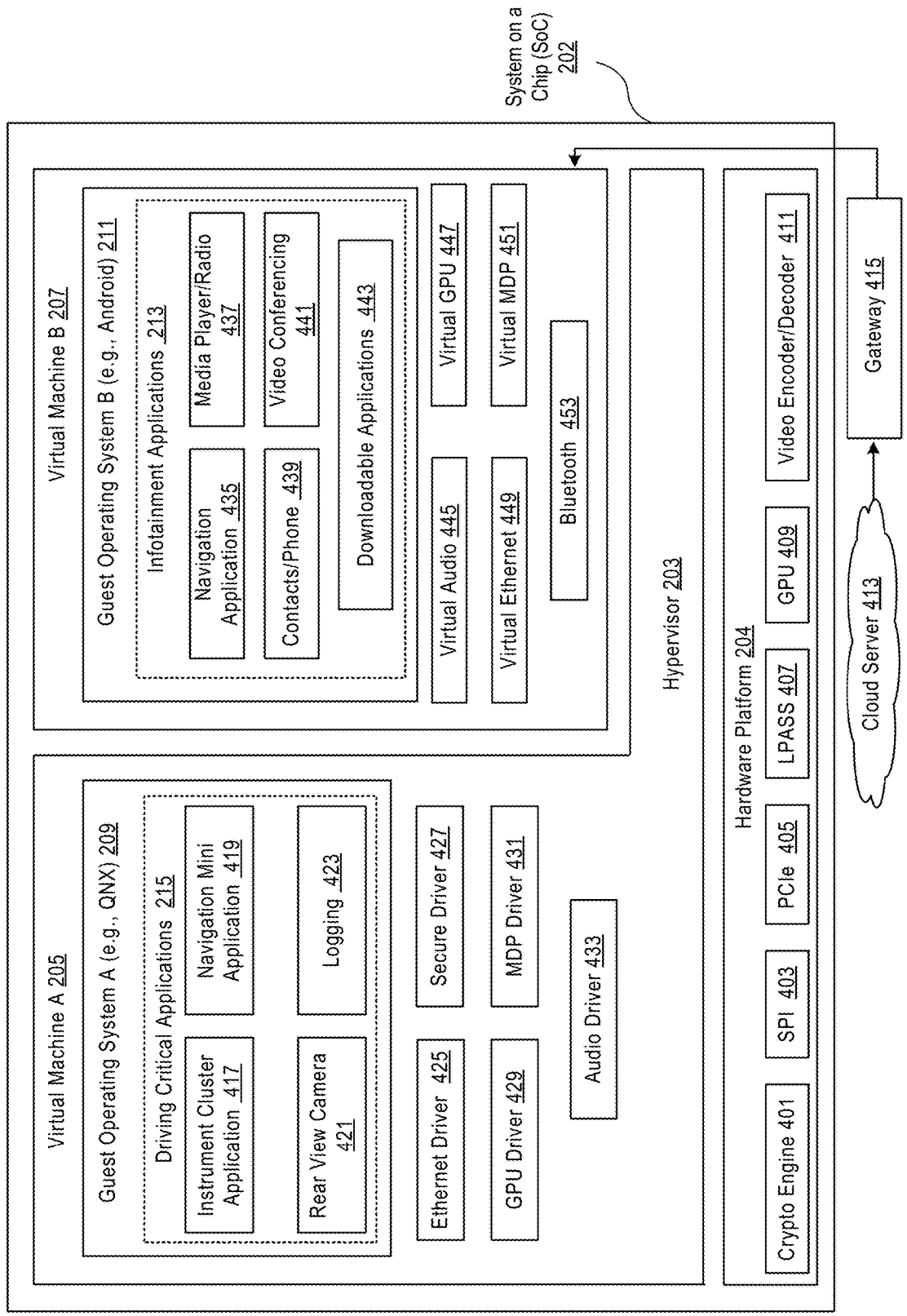
FIG. 4 shows, in block diagram form, example software applications installed in the example system described in FIG. 2, in accordance with an embodiment.

FIG. 4 shows, in block diagram form, examples of software applications installed in the example system described in FIG. 2.

As shown in FIG. 4, virtual machine B 208 can include a number of infotainment applications 213, for example, a navigation application (e.g., a Baidu map application) 435, a media player/radio application 437, a contacts/phone application 439, and a video conferencing application 441. The above applications can be installed in guest OS B 211. Further, additional applications 443 can be downloaded as needed from a cloud server 413 via a gateway.

For one embodiment, virtual machine B 207 also includes a number of virtualized devices, including a virtual GPU 447, a virtual audio device 445, a virtual Ethernet 449, a virtual Bluetooth 453, and a virtual resource manager 451 that uses a Markov Decision Process (MDP)-based algorithm. The virtual devices enable guest OS B 211 to share the hardware platform 204 with other operating systems on the SoC 202.

Guest OS A 209 can include a number of driving-critical applications 215, and a number of native drivers. Examples of driving-critical applications can include an instrument cluster application 417, a navigation mini application 419, a rear or surround view camera or radar application 421, and a logger 423. The native drivers can include an Ethernet driver 425, a security driver 427, a GPU driver 429, an MDP driver 431, and an audio driver 433. These drivers enable guest OS B 209 to directly interact with the hardware platform 204.

Figure 5:
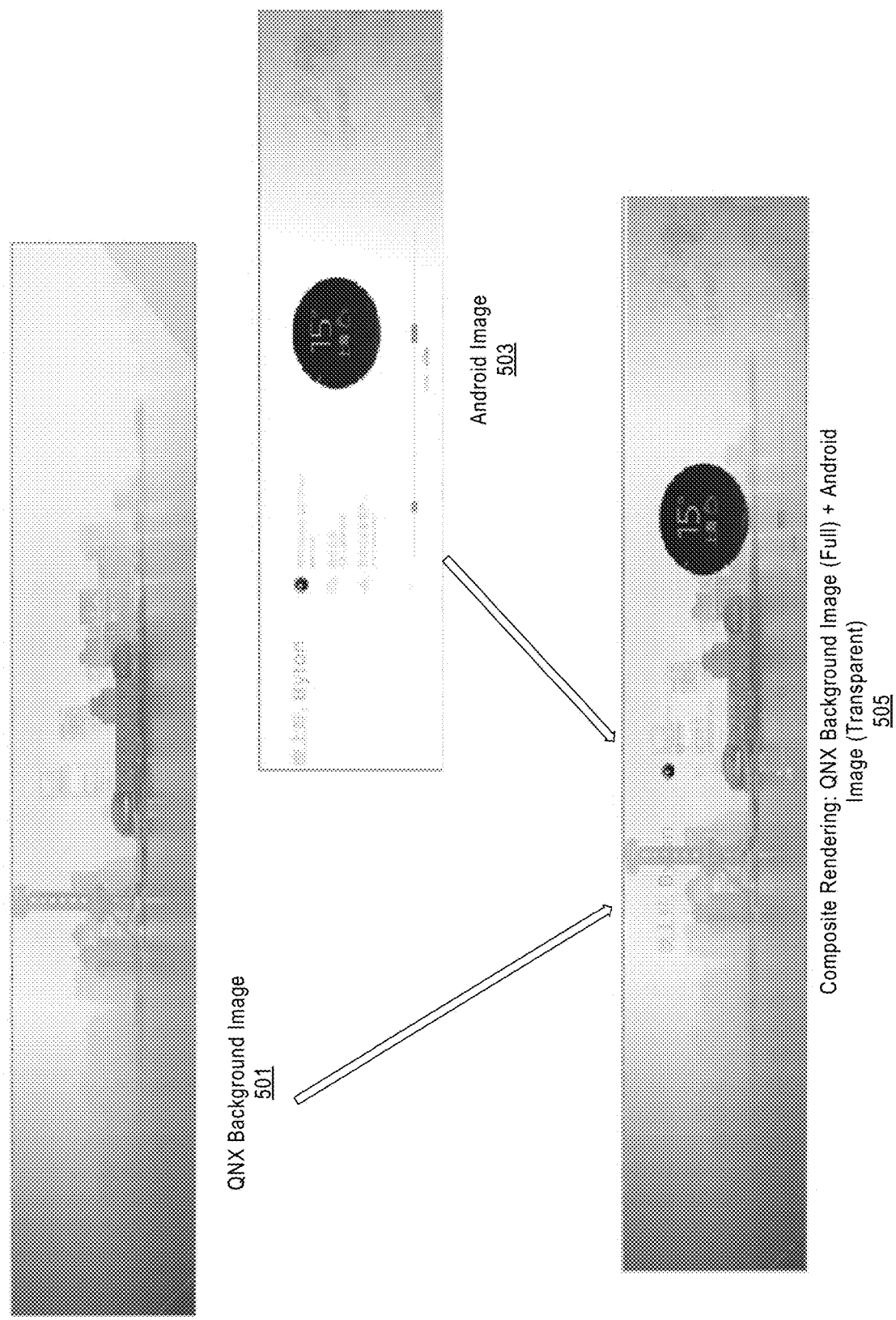
FIG. 5 shows one example process of creating a composite image for display on a dashboard screen.

FIG. 5 shows one example process of creating a composite image for display on a dashboard screen. In the figure, a background image 501 from a QNX operating system can be combined with an image 503 from an Android operating system to create a composite image 505. The image 503 is transparent, and therefore would appear seamlessly merged into the background image 501. In this example, the composition of the composite image 505 is made by the composition logic 218 using a hardware abstraction API in guest OS A 209 as described in FIG. 2, where no driving-critical application has been started yet for one embodiment.

As shown in the figure, for one embodiment, when a transparent image is combined with a non-transparent image to create a composite image, the composite can show the two images are seamlessly merged into one image, as if the transparent image is part of the non-transparent image. For example, in this figure, the Android image 503, which is transparent, is combined with the QNX background image 501. The composite image 505 shows the Android image 503 seamlessly merged into the QNX background image 501.

Figure 6:
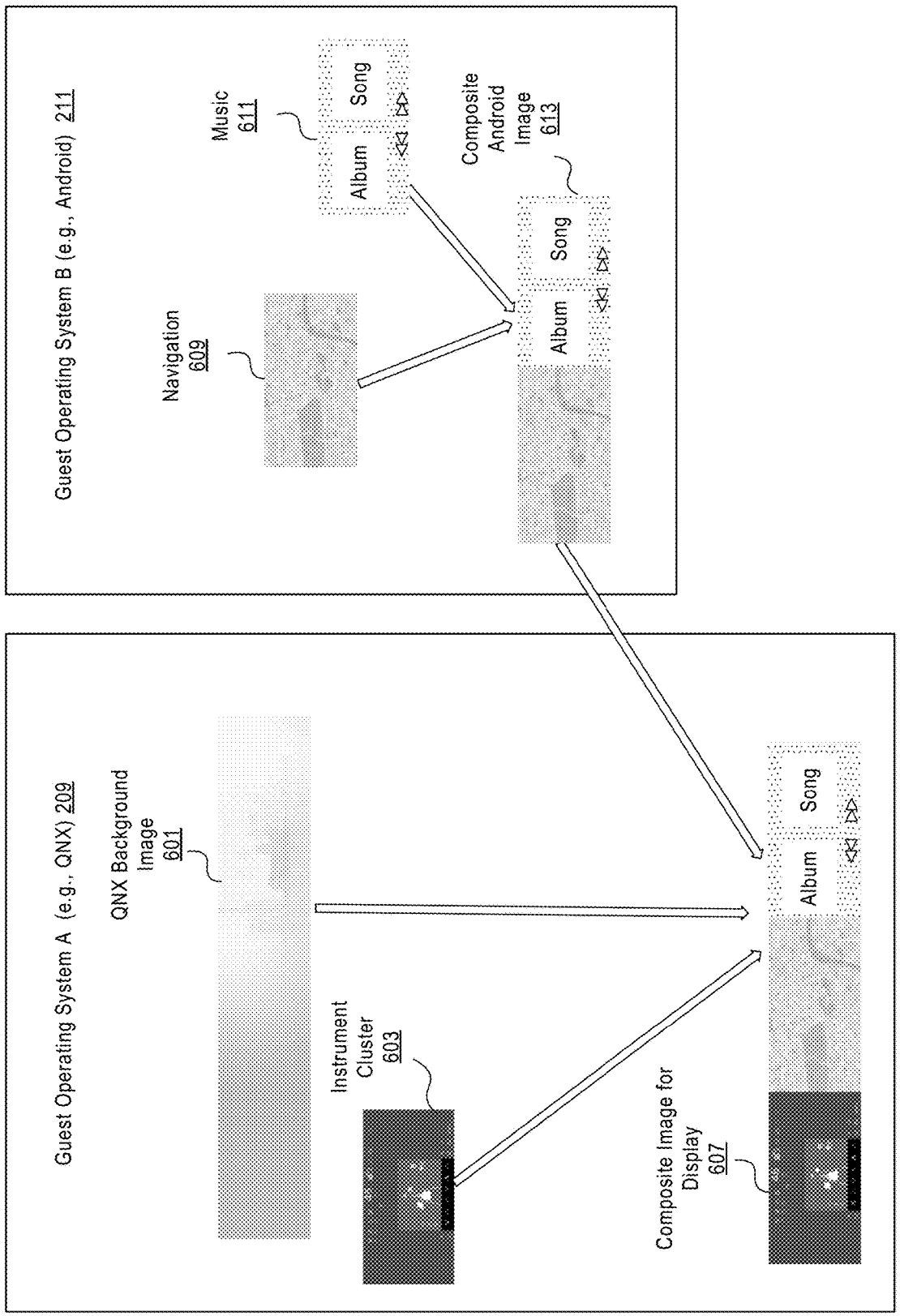
FIG. 6 shows another example process of creating a composite image for display on a dashboard screen, in accordance with an embodiment.

FIG. 6 shows another example process of creating a composite image for display on a dashboard screen. In this example, guest OS A 209 receives a composite image 613 from guest OS B 211. The composite image 613 is created by combining an image 609 from a navigation application and an image 611 from a media application. As described above, each image can be represented by a frame buffer. Guest OS A 209 can then create a composite image 607 for display on a dashboard screen from the received composite image 613, a background image 601, and an image from an instrument cluster application 603.

Figure 7:
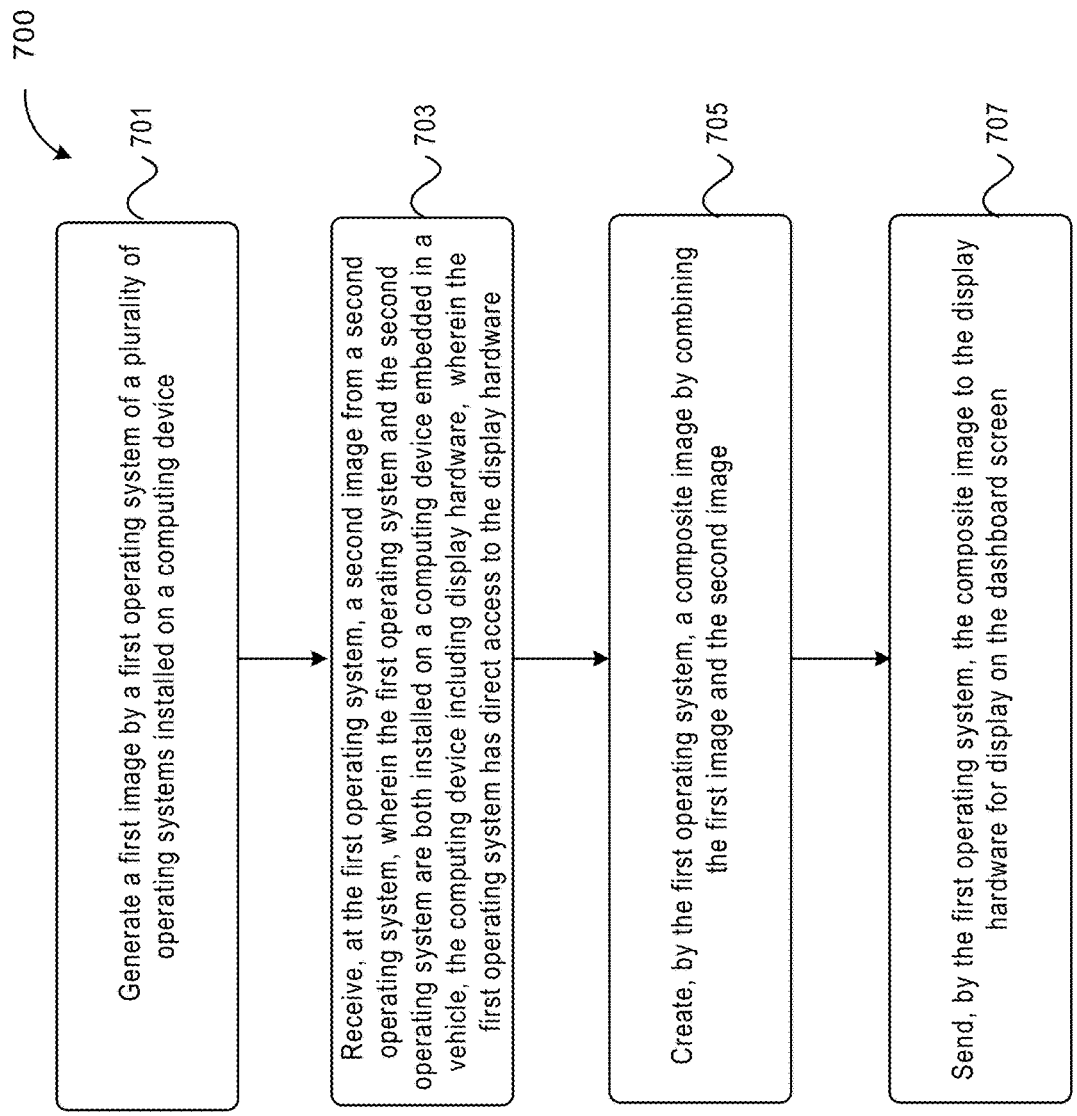
FIG. 7 is a flow diagram of one example method for outputting to a vehicle dashboard screen from a plurality of operating systems, in accordance with an embodiment.

FIG. 7 is a flow diagram of one example method for outputting to a vehicle dashboard screen from a plurality of operating systems. Method 700 can be performed by hardware (circuitry, dedicated logic, etc.), software (such as is run on a general purpose computer system or a dedicated machine), firmware, or a combination. For example, method 700 can use the system described in FIG. 2 or FIG. 3.

Referring to FIG. 7, in operation 701, a first operating system of a plurality of operating systems installed on a computing device. Each of the plurality of operating systems is installed in a separate virtual machine. The first operating system operates as a hypervisor that manages the plurality of operating systems, and includes a number of driving-critical applications. The computing device can be a System on a Chip (SoC) or a chipset. The first operating system may have direct access to one or more hardware display devices on the computing device.

In operation 703, the first operating system receives a second image from a second operating system of the plurality of operating systems. The second operating system can run infotainment applications, and can communicate with the first operating system through a secured interface. For one embodiment, an event listener in the second operating system can be registered with an event dispatcher in the first operating system, and can launch an event when the first operating system receives a user input or a system generated input. For one embodiment, an example system generated input is an input generated when the vehicle is parked. The registered event listener can process the event by prompting the second operating system to send one or more frame buffers representing one or more images to the first operating system. The one or more frame buffers may include display mode settings for displaying the images on a dashboard screen.

In operation 705, a composite image is created in the first operating system by combing the first image and the second image. A hardware abstraction API may be used when creating the composite image. The composite image may be represented by a single frame buffer with the mode settings received from the second operating system or a set of new mode settings provided by the first operating system.

In operation 707, the composite image can be sent to a video card on the computing device, where the video card can display the composite image at a predetermined frame rate on the dashboard screen in a vehicle.

Multi-Window Display Controller

Figure 8:
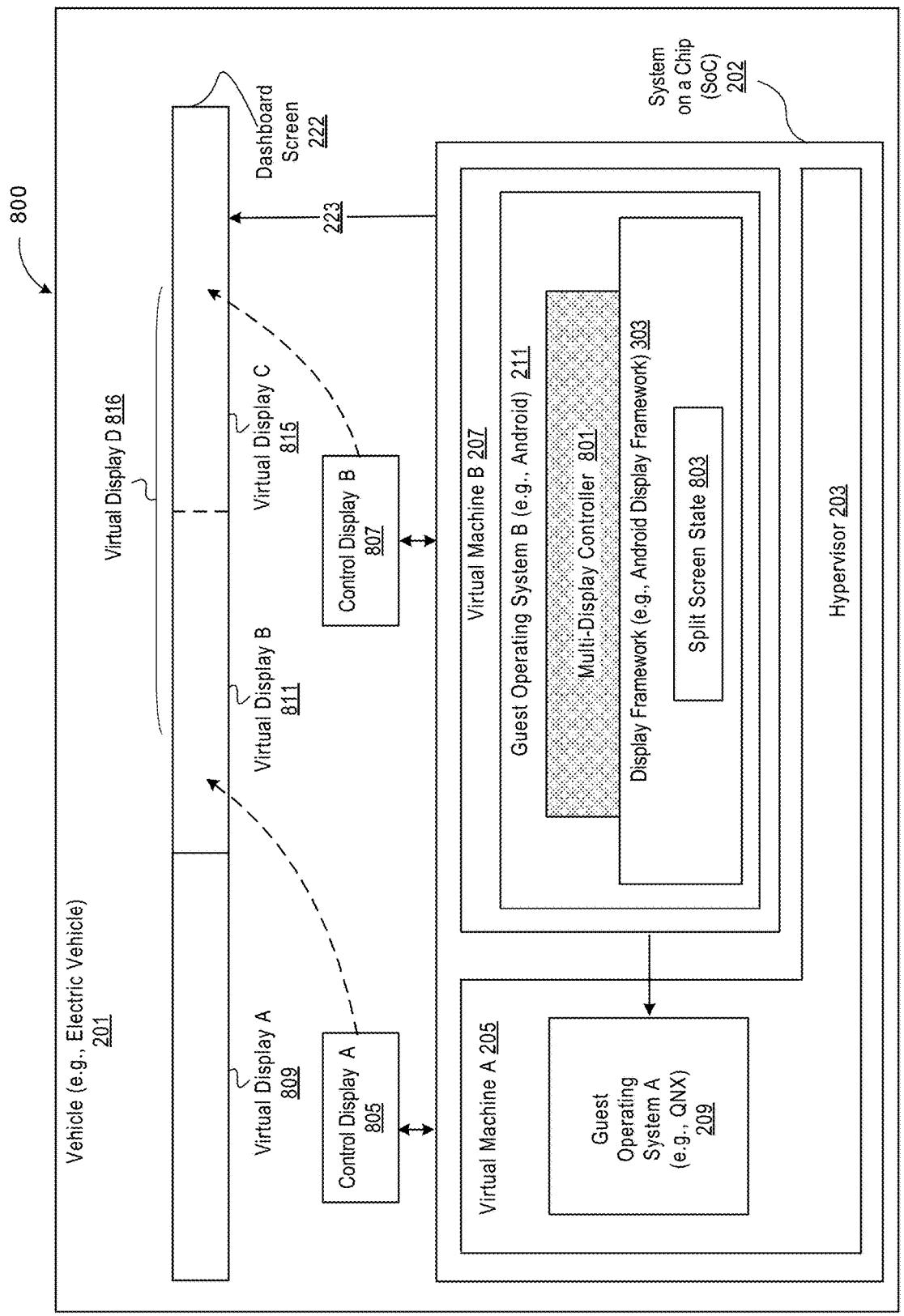
FIG. 8 shows, in block diagram form, an example system 800 for using multiple control displays to control displaying applications on a dashboard screen in a vehicle, in accordance with an embodiment.

FIG. 8 shows, in block diagram form, an example system 800 for using multiple control displays to control displaying applications on a dashboard screen in a vehicle, in accordance with an embodiment.

As shown in FIG. 8, the guest operating system B 211 can include a multi-window display controller 801, which can be built on the display framework 303. The display framework 303 can include APIs for creating virtual display areas in a single physical display, configuring the virtual display areas and the physical display (e.g., setting the size of the virtual display), and populating the virtual displays and the physical display with contents. The multi-window display controller 801 is a controlling application, and can implement and/or invoke one or more APIs in the display framework 303 to create virtual display A 809, virtual display B 811, virtual display C 815, and virtual display D 816 on the dashboard screen 222. Each of the virtual displays 809, 811, 815, and 816 is a logical subdivision of the dashboard screen 222 and can have its own display settings.

For one embodiment, virtual display A 809 can be configured to display only driving-critical applications regardless of whether the vehicle is stopped, or in motion (in full autonomous mode, or navigated by a driver), while virtual displays B 811, C 815, and D 816 can be configured to display non-driving-critical applications, such as infotainment applications. System 800 also includes control display A 805 and control display B. Control display A 805 can be positioned within a driving wheel of the vehicle 201 for use by a driver, while control display B 807 can be positioned between a driver seat and a front passenger seat, for use by both the driver and a passenger. Each of the control displays 805 and 807 can be a touchscreen tablet or another type of display that can display application menus and receive user inputs for selecting applications. Each of the control displays 805 and 807 can be connected to the SoC 202 through a physical cable, a wireless connection or a Bluetooth connection.

For one embodiment, each control display 805 or 807 can be configured to control a particular virtual display. For example, control display A 805 is configured to control virtual display B 811, and control display B 807 is configured to virtual display C 815. Control display B 807 can show an application menu, where a driver or passenger can select an application for display on virtual display C 815. The menu of applications on control display B 807 can include infotainment applications, for example, a media player, a radio, a map, a game, and a restaurant searching application. The menu of applications on control display A 805 can be a driving-relevant subset of the menu of applications on control display B 807 (e.g., climate control, map applications). An application (e.g., a game) that is considered to be distractive can be shown on control display B 807, but may not be shown on control display A 805.

Control display A 805 can include a function for enabling and disabling a split-screen mode of the dashboard screen 222. For one embodiment, a driver can use the function to disable or enable the split-screen mode while the vehicle is in motion. However, the split-screen mode can be automatically disabled in some circumstances, for example, when the vehicle is backing up, the driver can disable the split-screen mode. When the split-screen mode is disabled, the whole dashboard screen 222 can be occupied by instrument cluster applications or a set of other types of applications, and the menu of applications on either control display A 805 or control display B 807 will be also disabled; an user input on either control display 805 or 807 will not trigger an action on the dashboard screen 222.

For one embodiment, when the split-screen is disabled, a split-screen state indicator 803 can be saved to an object (e.g. by resetting the value of a property of the object) in the multi-window display controller 801, which can check the state before launching any application on the dashboard screen 222.

For one embodiment, virtual display D 816 can be used to display an application when the application is launched from both control display A 805 and control display B 807. Virtual display D 816 can be a composite virtual display of virtual display B 811 and virtual display C 815. Virtual display A 809, which shows instrument cluster applications, can be controlled by a third control display.

Figure 9:
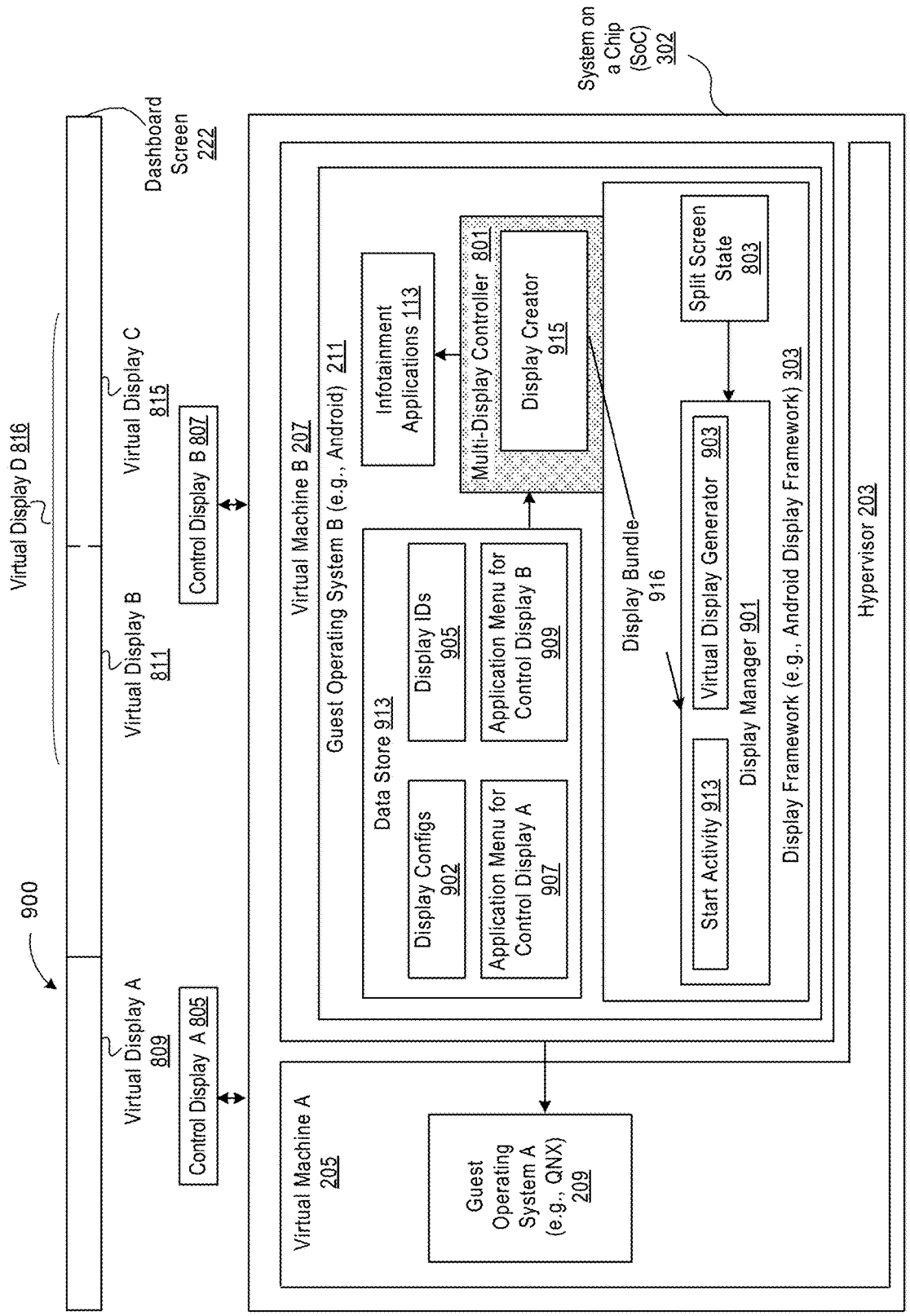
FIG. 9 shows, in block diagram form, another example system 900 using multiple control displays to control displaying applications on a dashboard screen in a vehicle, in accordance with an embodiment.

FIG. 9 shows, in block diagram form, another example system 900 using multiple control displays to control displaying applications on a dashboard screen in a vehicle, in accordance with an embodiment.

System 900, which further illustrates system 800, includes a data store 913 (e.g., a database) for display settings and display contents for the system. For one embodiment, the data store 913 can include display configurations 902, display IDs 905, application menu for control display A 907, and application menu for control display B 909. The display configurations 902 can include display settings (e.g., window size and resolution) for each physical display or virtual display. The display IDs 905 can include an identifier for each physical display and virtual display, each virtual display ID corresponding to one physical display ID. The application menu for control display A 907 includes a menu of applications to be displayed on control display A 805. The application menu for control display B 909 includes a menu of applications to be displayed on control display B 807.

For one embodiment, display settings for each physical display or virtual display can have a set of default values, which can be adjusted through one or more control displays (e.g., control display A 805). Similarly, each of the application menu for control display A 907 and the application menu for control display B 909 can also include a default application list, which can be adjusted via a user interface (not shown). The display IDs 905 can be provided by the display framework 303, which can detect any physical display plugged into the SoC 302, and can generate an identifier for each virtual display to be created on the physical displays 805, 807 and 222.

For one embodiment, a display creator 915 can implement a pre-determined algorithm for displaying contents on each of the physical displays 805, 807 and 222, and for using the control displays 805 and 807 to control the contents of the physical display 222. The display creator 915 can pass a display bundle 916 to the display manager 901. The display bundle 916 can include a source display ID, a target display ID, contents to be displayed on a physical or virtual display, and display settings for the physical or virtual display. If the target display ID is for either control display A 805 or control display B 807, the display creator 915 can default the source display ID to zero or to the target display ID. The display manager 901 can display the application menus 907 and 909 on control display A 805 and control display B 807 respectively.

However, if the target display ID is for the dashboard screen 222, the display manager 901 can check the split-screen state 803. If the split-screen state 803 indicates that the split-screen mode is disabled, the display manager 901 can generate a blank image, which can be sent to the guest operating system A 209 and combined therein with outputs from guest operating system A 209 into a composite image for display on the dashboard screen 222. If the split-screen mode is enabled, the display manager 901 can check the source display ID in the display bundle 916, and display one of the infotainment applications 113 on the dashboard screen 222. The virtual display that shows the infotainment application corresponds to a control display identified by the source display ID in the display bundle 916.

For example, if the control display where the infotainment application is selected is control display A 805, the infotainment application will be displayed on virtual display B 811. If the control display wherein the infotainment application is selected is control display B 807, the infotainment application will be displayed on virtual display C 815. If the infotainment application has been launched on a virtual display 811 or 815 through one of the control displays 805 and 807, launching the same infotainment application through the other control display 805 or 807 will cause the virtual display 811 or 815 to expand and become virtual display 816, where the infotainment information launched earlier can maintain its progression state.

As an illustrative example, if a map application is launched through control display A 805 on virtual display B 811, and a driving direction from city A to city B has been selected, launching the map application from control display B 807 will cause the running map application on virtual display B 811 to continue displaying the driving direction on virtual display D 816, which represents a merged virtual display between virtual display B 811 and virtual display C 815.

As further shown in FIG. 9, for one embodiment, the display manager 901 can include a virtual display generator 903 for creating a virtual display. The virtual display generator 903 can create a virtual display using information in the display bundle 916, which can include the virtual display's name, width, height, density in DPI, and an application to be displayed in the virtual display, and an identifier for the virtual display. A start activity method 913 in the display manager can launch an activity (either displaying an application menu or an application) on a physical display or virtual display indicated by a target display ID.

Figure 10A:
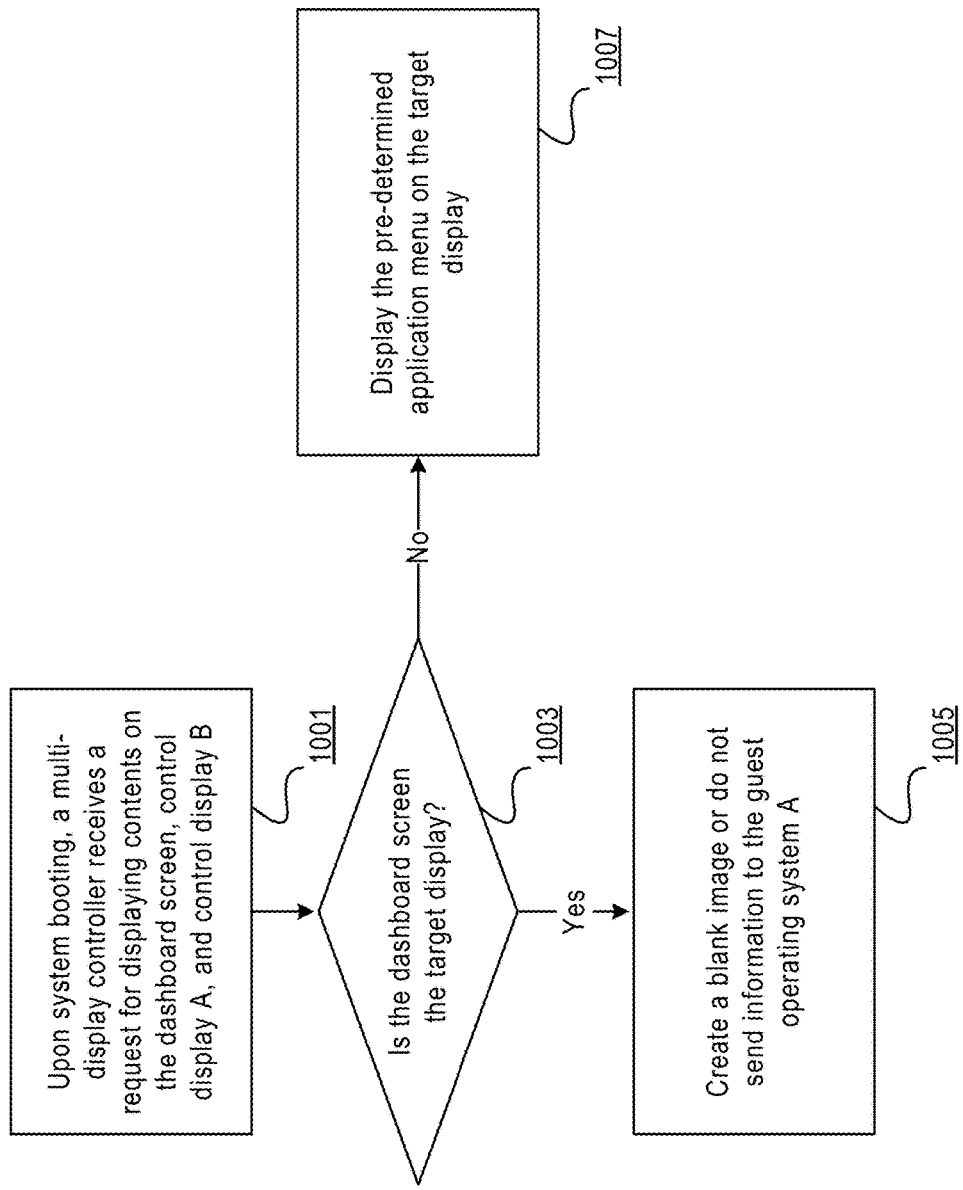
FIGS. 10A-10B illustrate example flow diagrams of using a multi-window display controller to control a dashboard screen, in accordance with an embodiment.

FIGS. 10A-1B illustrates example flow diagrams of using a multi-window display controller to control a coast-to-cost dashboard screen, in accordance with an embodiment.

For one embodiment, FIG. 10A illustrates an example flow diagram when the example system described in FIG. 9 reboots. As shown in FIG. 10, at step 1001, when the system reboots, a multi-window display controller (e.g., the multi-window display controller 801 in FIG. 8) receives a request from the system to populate the control displays (e.g., control display A 805 and control display B 807 in FIG. 9), and the dashboard screen 222. The multi-window display controller can receive a target display ID from the system, the target display ID representing a physical display, which can be the dashboard screen or one of the control displays. At step 1003, the multi-window display controller can determine whether the target display is the dashboard screen or a control display. If the target display is the dashboard screen as shown at step 1005, the multi-window display controller can invoke a display manager (e.g., the display manager 901 in FIG. 9) to generate a blank image and send the blank image to a guest operating system that runs instrument cluster applications (e.g., guest operating system B 209 in FIG. 9). However, if the target display is a control display as shown at step 1007, the multi-window display controller can invoke the display manager to display a predetermined application menu on that control display. Therefore, when the system reboots, the dashboard screen can show instrument clusters applications only, and each control display can show its pre-determined application menu.

Figure 10B:
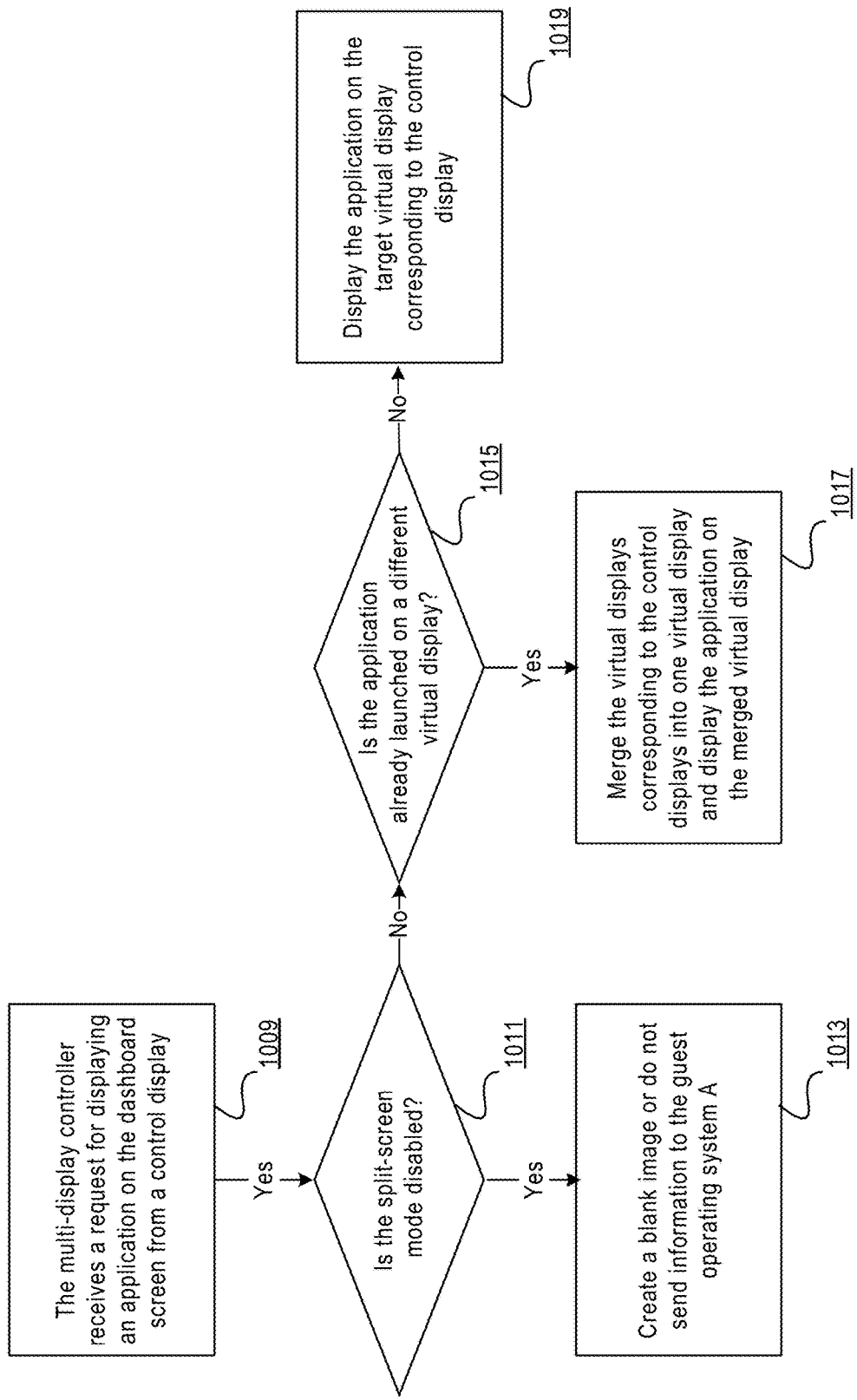

FIG. 10B illustrates a flow diagram for launching applications on the dashboard screen using the control displays. As shown in FIG. 10, at step 1009, the multi-window display controller receives a request from a control display for launching an application on a target virtual display on the dashboard screen. At step 1011, the multi-window display controller can check whether the split-screen mode is disabled. If the split-screen mode is disabled, as shown at step 1013, the multi-window display controller can invoke a display manager to generate a blank image and send the blank to a guest operating system running instrument cluster applications.

If the split-screen mode is not disabled, the multi-window display controller can check whether the application has been launched on a virtual display other than the target virtual display on the dashboard screen, as shown at step 1015. At step 1017, the application has been launched on a different virtual display on the dashboard screen through another control display, and the multi-window display controller can combine the different virtual display and the target virtual display, and continue displaying the launched application on the combined virtual display. At step 1019, the application has not been launched through another control display, and the multi-window display controller can launch the application on the virtual display corresponding to the control display.

Figure 11A:
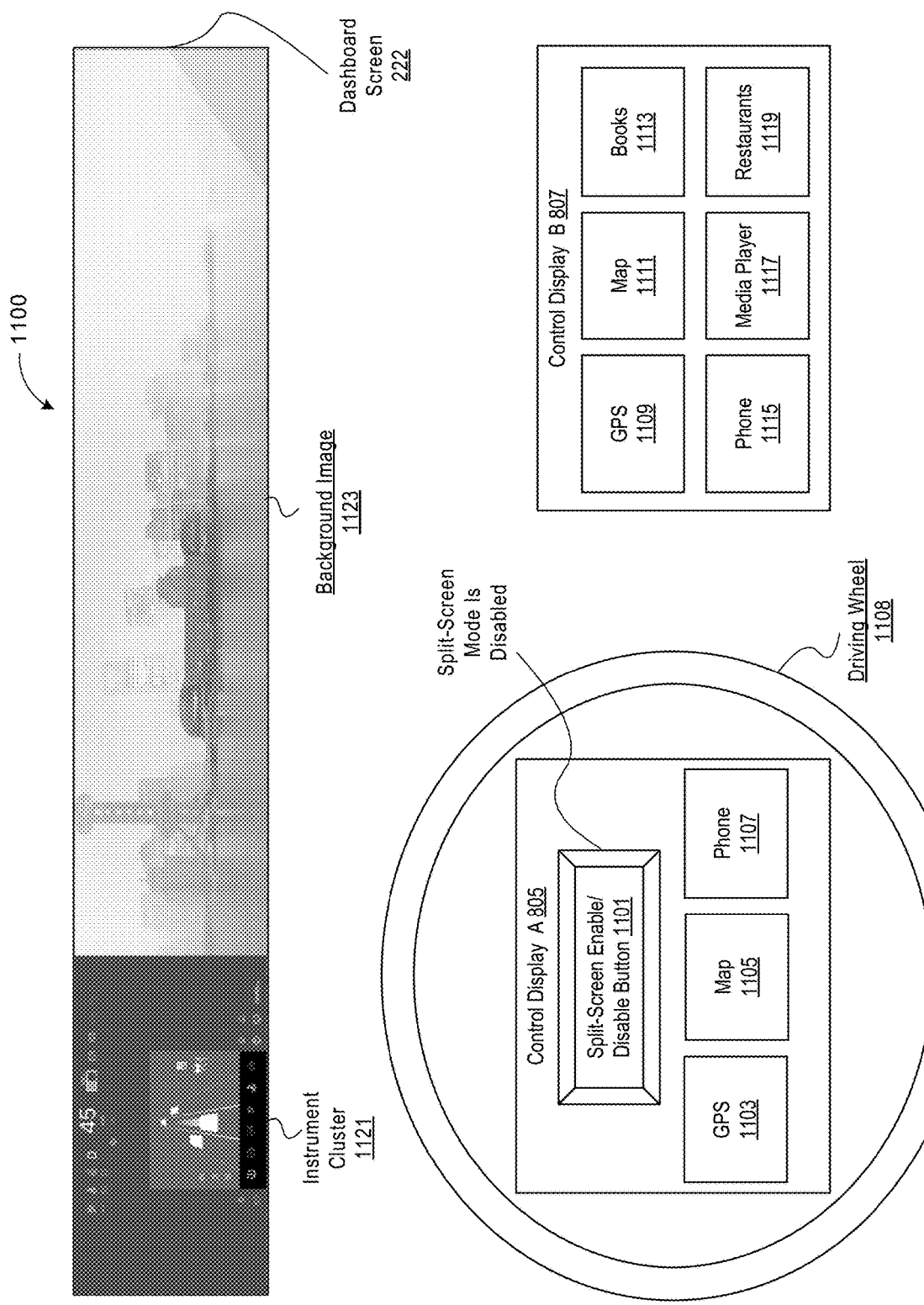
FIGS. 11A-11C illustrate example use cases of controlling a dashboard screen using multiple control displays, in accordance with an embodiment.
Figure 11B:
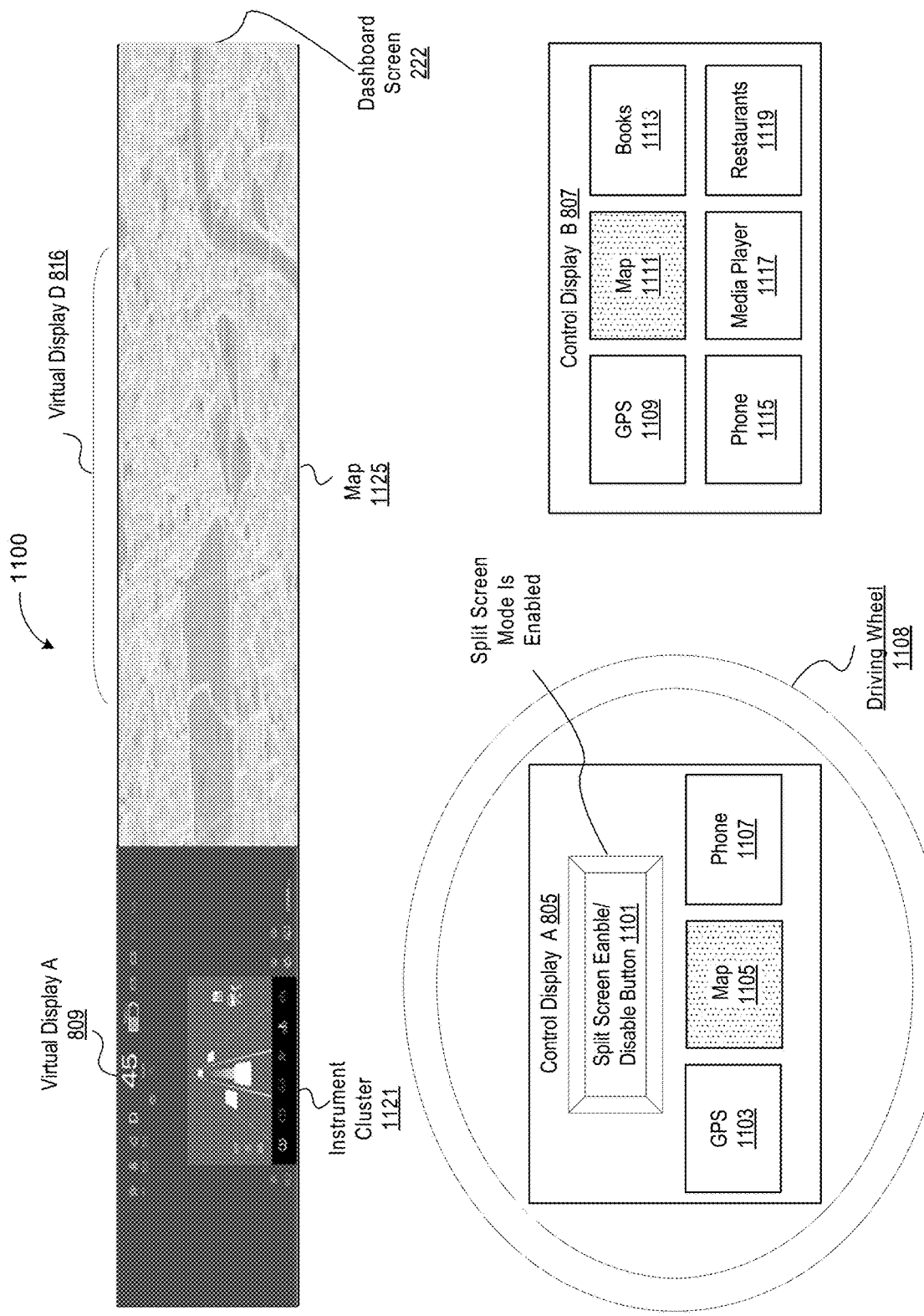
Figure 11C:
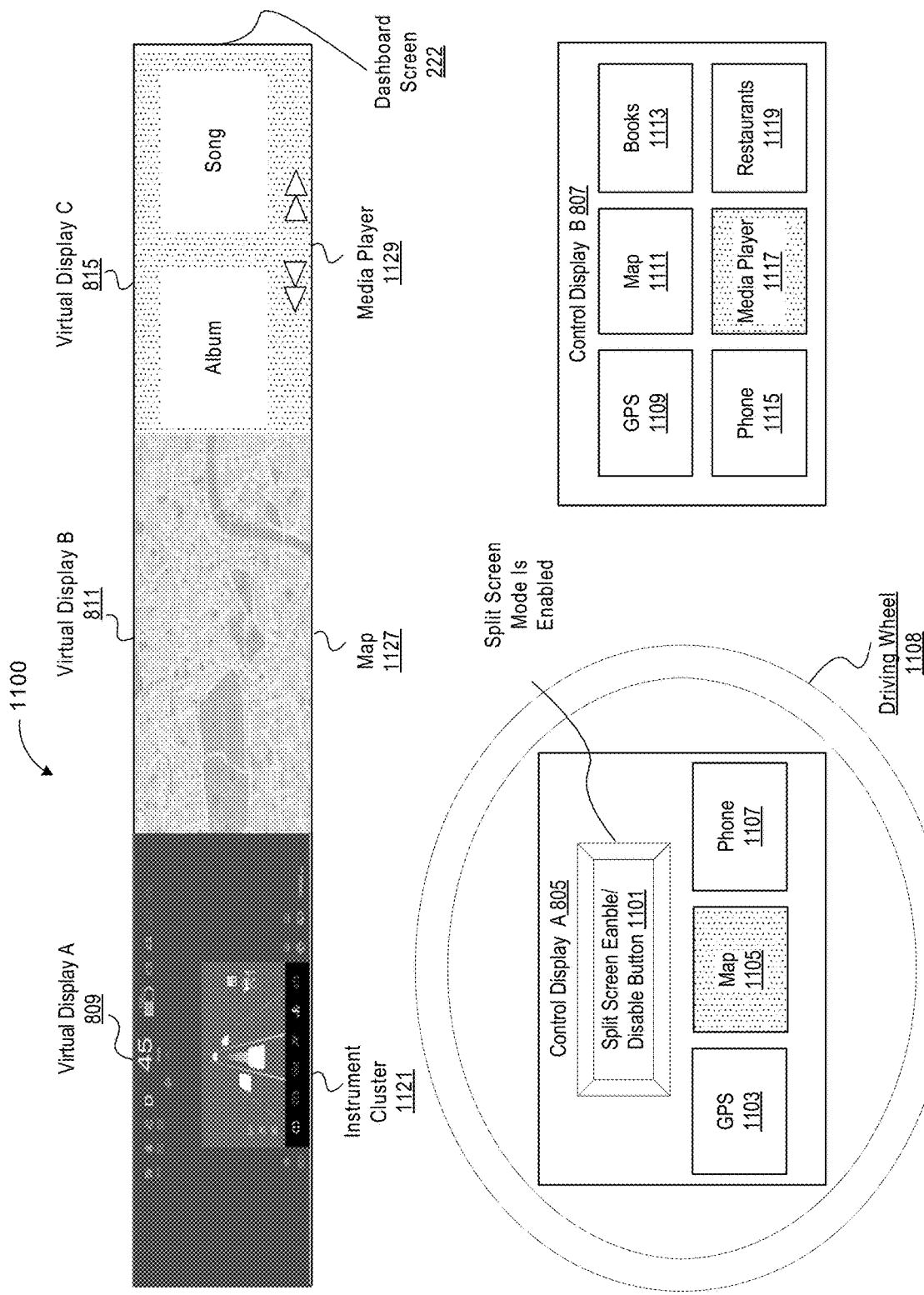

FIGS. 11A-11C illustrate example use cases of controlling the dashboard screen using multiple control displays, in accordance with an embodiment.

As shown in FIG. 11A, a driving wheel 1108 can include control display A 805, with a split-screen enable/disable button 1101. Control display A 805, which can be a touchscreen tablet, can further include a menu of applications, for example, a GPS 1103, a map 1105, and a phone dialer 1107. FIG. 11A also shows the control display B 807, which can be positioned between a passenger seat and a front passenger seat. The control display B 807, which can similarly be a touchscreen tablet, can include a menu of applications, for example, a GPS 1109, a map 1111, a books reader 1113, a phone dialer 1115, a media player 1117, and a restaurant searching application 1119. As shown in FIG. 11A, the application menu on control display A 805 is a subset of the application menu on control display B 807. In FIG. 11A, since the split-screen enable/disable mode is disabled, the dashboard screen 222 only shows instrument cluster applications 1121 and a background image 1123.

In FIG. 11B, the split-screen enable/disable mode is enabled, the map 1105 and 1111 is launched from both control display A 805 and control display b 807. In this use case, the map application 1125 is displayed on virtual display D 816, instead of being displayed on two different virtual displays corresponding to control display A 805 and control display B 807.

In FIG. 11C, the split-screen mode is enabled, two different applications are launched from the control displays: a map 1105 is launched from control display A 805, and a media player 1117 is launched from control display B 807. In this use case, the map 1127 and the media player 1129 are displayed on different virtual displays 1127 and 1129 on the dashboard screen 222.

Figure 12:
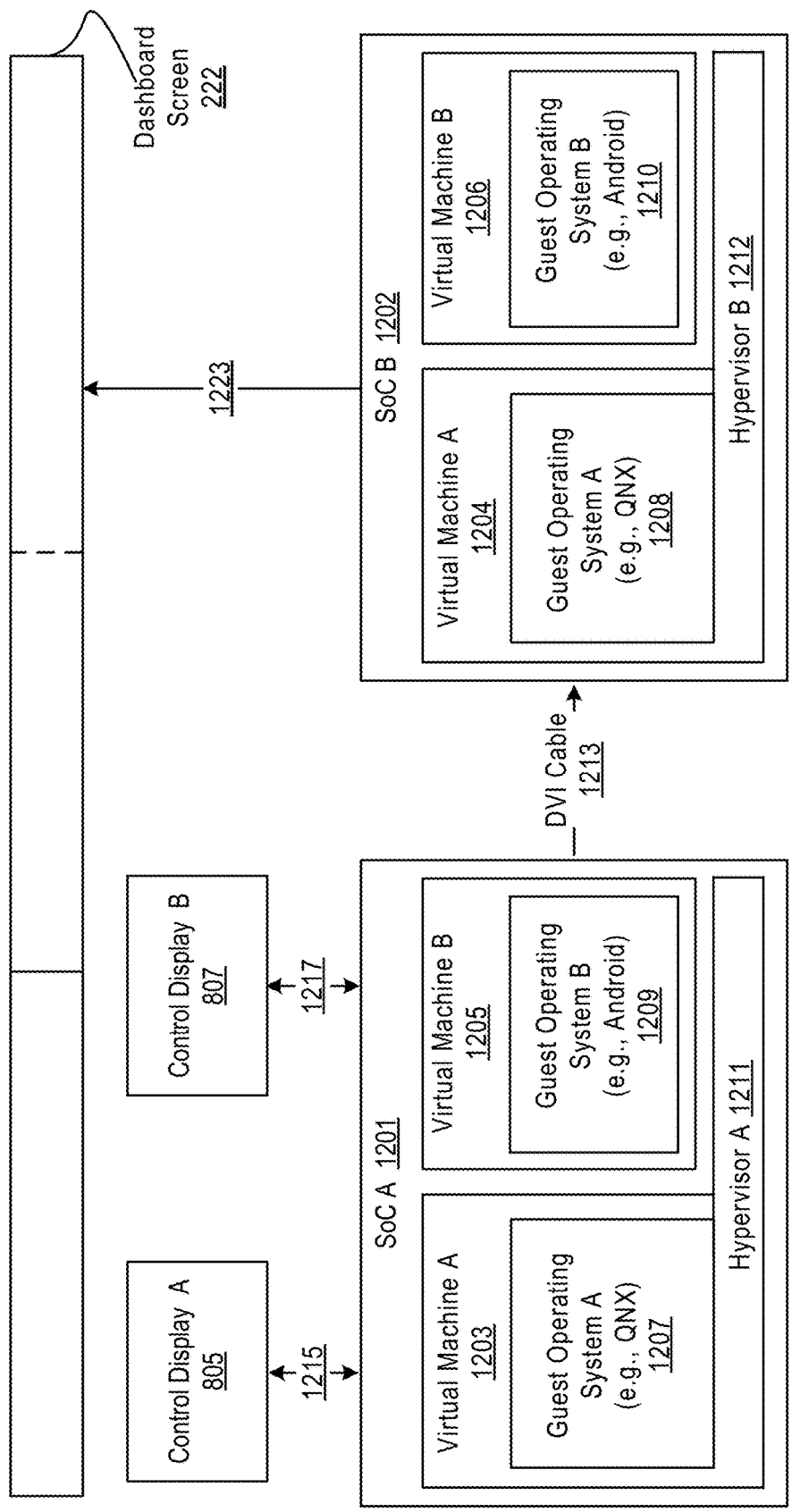
FIG. 12 illustrates an example system 1200 that uses an integrated circuit to increase the computing power of the example system 800 in accordance with an embodiment.

FIG. 12 illustrates an example system 1200 that uses a SoC to increase the computing power of the example system 800 in accordance with an embodiment.

The system 800 described above processes graphics and videos, and may require computing power that a single integrated circuit with a cost below a threshold may not be able to satisfy. System 1200 uses a second SoC 1202 connected to a first SoC 1201 using a DVI cable 1213 to increase the computing power of the first SoC 1201.

As shown in FIG. 12, the first SoC 1201 and the second SoC 1202 include the same software stack. For example, each of SoCs 1201 and 1202 includes a hypervisor 1211 or 1212, a first operating system 1207 or 1208 in a first virtual machine 1203 or 1204 managed by the hypervisor, a second operating system 1209 or 1210 in a second virtual machine 1205 or 1206 running on top of the first virtual machine 1201 or 1202, and a multi-window display controller 1214 or 1215 running in the second operating system 1209 or 1210.

For one embodiment, the first SoC 1201 and the second SoC 1202 can be connected using a DVI cable 1213 or another type of audio/video cable. The first SoC 1201 is connected to control display A 805 and control display B 807, and the second SoC 1202 is connected to the dashboard screen 222. The multi-window display controller 1214 in the first SoC 1201 can display application menus on control display A 805 and control display B 807. Requests for launching applications from the two control displays 805 and 807 can be routed via the DVI cable 1213 to the second SoC 1202, wherein the multi-window display controller 1215 can process the requests.

Figure 13:
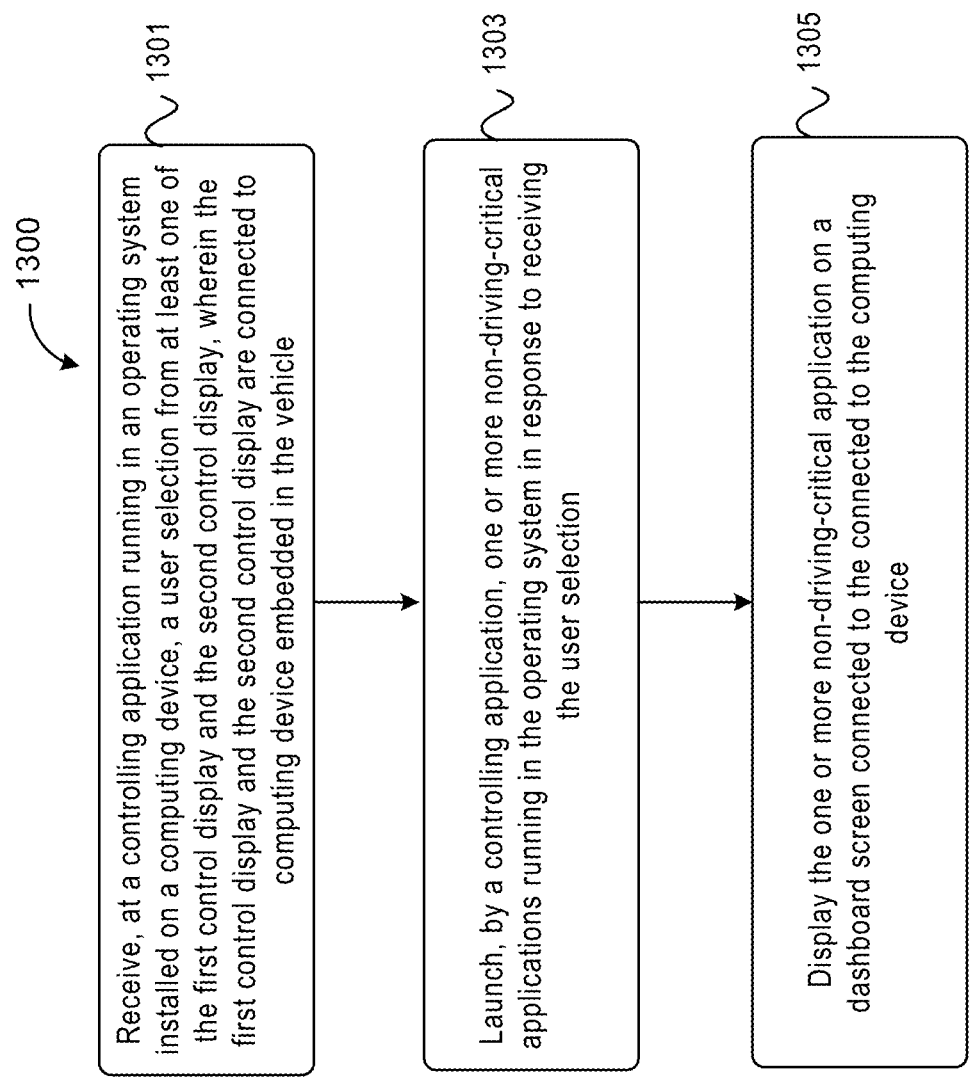
FIG. 13 is a flow diagram of one example method for outputting to a dashboard screen from multiple operating systems, in accordance with an embodiment.

FIG. 13 is a flow diagram of one example method for outputting to a vehicle dashboard screen from a plurality of operating systems. Method 1300 can be performed by hardware (circuitry, dedicated logic, etc.), software (such as is run on a general purpose computer system or a dedicated machine), firmware, or a combination. For example, method 1300 can use the system described in FIG. 8 or FIG. 9.

Referring to flow diagram 1300, in operation 1301, a user selection from at least one of the first control display and the second control display is received at a controlling application running in an operating system installed in a computing device embedded in a vehicle. The computing device is connected to a coast-to-coast dashboard screen including multiple virtual display areas. The first control display and the second control display are both connected to the integrated circuit through a physical cable, or a wireless connection such as a Bluetooth or WiFi connection. The first control display can be positioned within a driving wheel of the vehicle and include an application menu. The second control display is positioned between the driver seat and a front passenger seat. The first control display can include an application menu which is a subset of an application menu on the second control display.

In operation 1303, in response to receiving the user selection, the controlling application launches one or more non-driving-critical applications running in the operating system. The one or more non-driving-critical applications can be infotainment applications. A driver can use both the first control display and the second control display to launch applications, while the passenger in a passenger seat (e.g., the front passenger seat on the other side of the second control display, or another passenger seat) can only use the second control display to launch an application.

In operation 1305, the controlling application can display the one or more applications on a dashboard display screen connected to the computing device. When the driver and a passenger select different applications from the first control display and the second control display, the controlling application can display the selected non-driving-critical applications in different virtual display areas on the dashboard screen. However, if an application is being displayed in a virtual display area on the dashboard screen in response to a selection from one control display and the same application is selected again from the other control display, the controlling application will display the application in an expanded virtual display area on the dashboard screen.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in various ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable one to make or use the methods, systems, and apparatus of the present disclosure. Various modifications to these embodiments will be readily apparent, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for outputting to a dashboard screen for a vehicle from a plurality of operating systems, the system comprising:
    a computing device, which includes display hardware, embedded in the vehicle;
    a first operating system and a second operating system installed on the computing device and connected by a secured interface, the secured interface enabling a one-way communication of application data from the second operating system to the first operating system, the first operating system having direct access to the display hardware, and configured to
        generate a first image,
        receive a second image from the second operating system via the secured interface,
        create a composite image by combining the first image and the second image, and
        transmit the composite image to the display hardware for display on the dashboard screen.

2. The system of claim 1, wherein the first operating system is to run one or more driving-critical applications and the second operating system is to run one or more non-driving critical applications, the first operating system including a plurality of security features and having direct access to one or more hardware devices.

3. The system of claim 1, wherein the second image is a transparent image generated from one of the one or more non-driving critical applications.

4. The system of claim 1, wherein the computing device is a single integrated circuit, a device including a plurality of chips integrated onto a motherboard, or a device including a plurality of integrated circuits.

5. The system of claim 1, wherein the first operating system is to boot before the second operating system.

6. The system of claim 1, wherein the first operating system and the second operating system are to communicate with each other only via the secured interface.

7. The system of claim 1, wherein the second image is a composite image from a plurality of applications in the second operating system.

8. The system of claim 1, wherein the second image is sent to the first operating system in response to an event launched from one of the first operating system and the second operating system.

9. The system of claim 1, further comprising:
    a first control display;
    a second control display;
    the computing device is-connected to the dashboard screen, a first control display, and a second control display;
    the second operating system including a controlling application, and one or more non-driving-critical applications;
    the controlling application configured to launch the one or more non-driving-critical applications on the display screen in response to receiving a user selection from at least one of the first control display and the second control display.

10. A method for outputting to a dashboard screen from a plurality of operating systems, the method comprising:
    generating a first image by a first operating system;
    receiving, at the first operating system, a second image from a second operating system via a secured interface, the first operating system and the second operating system installed on a computing device embedded in a vehicle and connected by the secured interface, the secured interface enabling a one-way communication of application data from the second operating system to the first operating system, the computing device including display hardware directly accessible to, the first operating system;
    creating, by the first operating system, a composite image by combining the first image and the second image; and
    sending, by the first operating system, the composite image to the display hardware for display on the dashboard screen.

11. The method of claim 10, wherein the first operating system is to run one or more driving-critical applications and the second operating system is to run one or more non-driving critical applications, the first operating system in including a plurality of security features and having direct access to one or more hardware devices.

12. The method of claim 10, wherein the second image is a transparent image generated from one of the one or more non-driving critical applications.

13. The method of claim 10, wherein the computing device is a single integrated circuit, a device including a plurality of chips integrated onto a motherboard, or a device including a plurality of integrated circuits.

14. The method of claim 10, wherein the first operating system is to boot before the second operating system.

15. The method of claim 10, wherein the first operating system and the second operating system are to communicate with each other only via the secured interface.

16. The method of claim 10, wherein the second image is a composite image from a plurality of applications in the second operating system.

17. The method of claim 10, wherein the second image is sent to the first operating system in response to an event launched from one of the first operating system and the second operating system.

18. The method of claim 10, wherein the second image is sent to the first operating system in response to an event launched from one of the first operating system and the second operating system.

19. The method of claim 10, further comprising
receiving a user selection from at least one of a first control display and a second control display, the first control display and the second control display connected to the computing device embedded in the vehicle;
launching, by a controlling application running in the second operating system, one or more non-driving-critical applications; and
displaying the one or more non-driving-critical application on the dashboard screen connected to the computing device.

20. A non-transitory machine-readable medium storing executable computer program instructions for outputting to a dashboard screen from a plurality of operating systems, the program instructions, when executed by a processor, causes the processor to perform operations, the operations comprising:
generating a first image by a first operating system;
receiving, at the first operating system, a second image from a second operating system via a secured interface, the first operating system and the second operating system installed on a computing device embedded in a vehicle and connected by the secured interface, the secured interface enabling a one-way communication of application data from the second operating system to the first operating system, the computing device including display hardware directly accessible to the first operating system;
creating, by the first operating system, a composite image by combining the first image and the second image; and
sending, by the first operating system, the composite image to the display hardware for display on the dashboard screen.

21. The non-transitory machine-readable medium of claim 20, wherein the first operating system is to run one or more driving-critical applications and the second operating system is to run one or more non-driving critical applications, the first operating system including a plurality of security features and having direct access to one or more hardware devices.

22. The non-transitory machine-readable medium of claim 20, wherein the second image is a transparent image generated from one of the one or more non-driving critical applications.

23. The non-transitory machine-readable medium of claim 20, wherein the computing device is a single integrated circuit, a device including a plurality of chips integrated onto a motherboard, or a device including a plurality of integrated circuits.

24. The non-transitory machine-readable medium of claim 20, wherein the first operating system is to boot before the second operating system.

25. The non-transitory machine-readable medium of claim 20, wherein the first operating system and the second operating system are to communicate with each other only via the secured interface.

26. The non-transitory machine-readable medium of claim 20, wherein the second image is a composite image from a plurality of applications in the second operating system.

27. The non-transitory machine-readable medium of claim 20, further comprising:
receiving a user selection from at least one of a first control display and a second control display, the first control display and the second control display connected to computing device embedded in the vehicle;
launching, by a controlling application running in the second operating system, one or more non-driving-critical applications; and
displaying the one or more non-driving-critical application on the dashboard screen connected to the computing device.

* * * * *